(12) United States Patent
Fox

(10) Patent No.: US 9,795,153 B2
(45) Date of Patent: Oct. 24, 2017

(54) BITE-SIZED ICES COMPOSED OF NATURAL INGREDIENTS AND METHOD FOR PROCESSING AND APPARATUS FOR PACKAGING THE SAME

(71) Applicant: Paulette Suzanne Fox, New York, NY (US)

(72) Inventor: Paulette Suzanne Fox, New York, NY (US)

( * ) Notice: Subject to any disclaimer, the term of this patent is extended or adjusted under 35 U.S.C. 154(b) by 0 days.

(21) Appl. No.: 13/843,830

(22) Filed: Mar. 15, 2013

(65) Prior Publication Data
US 2014/0023775 A1 Jan. 23, 2014

Related U.S. Application Data

(60) Provisional application No. 61/672,823, filed on Jul. 18, 2012.

(51) Int. Cl.
| | |
|---|---|
| A23G 3/00 | (2006.01) |
| B65D 77/02 | (2006.01) |
| B65D 5/50 | (2006.01) |
| A23G 9/42 | (2006.01) |
| A23G 9/08 | (2006.01) |
| A23G 9/34 | (2006.01) |

(52) U.S. Cl.
CPC ............... *A23G 9/42* (2013.01); *A23G 9/083* (2013.01); *A23G 9/34* (2013.01)

(58) Field of Classification Search
CPC ............. A23G 9/34; A23G 9/42; A23G 9/083
USPC .......................... 426/100, 660, 108, 119, 658
See application file for complete search history.

(56) References Cited

U.S. PATENT DOCUMENTS

| | | | | |
|---|---|---|---|---|
| 5,393,032 A | * | 2/1995 | Cederroth ...................... | 249/61 |
| 2001/0053404 A1 | * | 12/2001 | Powrie et al. ................ | 426/599 |
| 2008/0020120 A1 | * | 1/2008 | O'Donnell Kiely .......... | 426/549 |
| 2009/0252796 A1 | * | 10/2009 | Mazed et al. ................. | 424/484 |
| 2009/0274791 A1 | * | 11/2009 | Mattson et al. ................. | 426/2 |
| 2010/0159107 A1 | * | 6/2010 | Ghodsian et al. ............ | 426/590 |
| 2011/0155915 A1 | * | 6/2011 | Brueck et al. ............ | 250/354.1 |
| 2011/0281011 A1 | * | 11/2011 | Colavito ....................... | 426/572 |

FOREIGN PATENT DOCUMENTS

| | | | | | |
|---|---|---|---|---|---|
| IN | | 190781 B | * | 8/2003 | |
| JP | | 10066520 A | * | 3/1998 | |
| WO | WO 2004008885 A1 | * | 1/2004 | ............... A23L 2/02 |

OTHER PUBLICATIONS https://nutritiondata.self.com/facts/nut-and-seed-products/3115/2, Oct. 3, 2016, 4 pages.*

* cited by examiner

*Primary Examiner* — Jyoti Chawla
(74) *Attorney, Agent, or Firm* — Hudnell Law Group P.C.

(57) ABSTRACT

The present invention relates to bite-sized ices, composed of natural ingredients and specially formulated with various Superfoods and everyday health boosters, a method for processing, and apparatus for packaging the same. The present inventive composition preferably comes in multiple flavors; each flavor preferably comprising a unique ingredient profile. The ingredients are mixed using a thermal process involving a hot fill hold such that the composition and the packaging are sterilized at the same time. The packaging allows the composition to be sold shelf stable and to be a freeze and eat product, thereby providing convenience to the consumer.

8 Claims, 6 Drawing Sheets

BITE-SIZED ICES COMPOSED OF NATURAL INGREDIENTS AND METHOD FOR PROCESSING AND APPARATUS FOR PACKAGING THE SAME

This application claims the benefit of priority to U.S. Provisional Patent Application Ser. No. 61/672,823, filed Jul. 18, 2012.

FIELD OF THE DISCLOSURE

The present disclosure relates to the field of healthy frozen treats. More specifically, the present disclosure relates to a novel bite-sized icy "cubettes," composed of nutrients and vitamins, sold shelf stable, and a method for processing and an apparatus for packaging the same.

BACKGROUND

The statements in this section merely provide background information related to the present disclosure and may not constitute prior art.

Traditional ice chips are known to have therapeutic effects. They are made from plain water and provide hydration, however, do not provide any nutritional component. The need for such a product arises in several contexts, including but not limited to, as a healthy frozen treat for health conscious consumers and as a patient care product for those who are facing various medical challenges.

Popsicles are one type of common frozen treat. The popsicle, however, is not typically an option for health conscious consumers, as it is often without healthy ingredients. The serving size is also typically one pop, which has a tendency to be more than a consumer wants and often goes to waste if not consumed all at once. Popsicles are sold frozen, and therefore, also subject to melting if not timely stored frozen.

Further, the popsicle, though regularly offered, is increasingly unwelcomed in healthcare facilities, because, while it may be soothing, it is not nourishing. Often times, patients are unable to eat food or drink liquids before or after undergoing a particular medical procedure. Nevertheless, patients still need to be hydrated and nourished. Patients may be given plain ice chips to provide hydration, but such ice chips have no nutritional component, and therefore do not provide any source of nourishment. Popsicles are also typically high in sugars and too large of a serving size for those who are medically comprised.

Health conscious consumers, as well as healthcare facilities (and their patients), now increasingly desire alternative delivery systems for vitamins and nutrient rich ingredients. Indeed, several consumer products exist on the market that infuse such nourishing aspects into their products that, by themselves have, little if any nutritional value, such as water and gum. However, there is no bite-sized ices product, composed of natural ingredients, that offers a better-for-you healthy frozen treat and convenience to health conscious consumers, and no such product for those undergoing medical procedures or struggling with health issues. There also is no bite-sized ices product, composed of natural ingredients, sold in a shelf-stable liquid form that may be ultimately frozen by the consumer at their own convenience.

SUMMARY

The present invention solves the problem by blending together a variety of all-natural ingredients to form bite-sized ices that are delivered in freeze and eat ice cubette trays.

In a preferred embodiment, the invention is a shelf stable, freezable liquid composition comprising the following ingredients: water, agave syrup, guar or gellan or pectin gum, fruit or vegetable concentrate, powder or puree, and natural flavor. The fruits or vegetable concentrate may further comprise one or more of the following ingredients: coconut water concentrate, orange juice concentrate, apple juice concentrate, cherry juice concentrate, kale juice, yumberry juice concentrate, blueberry juice concentrate, blackberry juice concentrate, and black currant concentrate. The powder or puree may further comprise one or more of the following ingredients: cocoa powder, green tea extract, spirulina powder, chlorella powder, banana puree, mangosteen puree, lemon puree, and minced ginger. The natural flavor may further comprise one or more of the following ingredients: blood orange flavor, lemon flavor extract, chocolate flavor, vanilla extract, green tea flavor, and blueberry flavor.

In a preferred embodiment, the inventive liquid composition may be formed by a method comprising the steps of: mixing the ingredients into a homogeneous mixture; heating the mixture; filling the mixture into a container; capping the container, holding the container inverted; and cooling the mixture.

One advantage of the present invention is that it provides a convenient delivery system for health conscious consumers.

Another advantage of the present invention is that it may be sold in distinct flavors.

Another advantage of the present invention is that it may include a blend of Superfoods and everyday health boosters.

Another advantage of the present invention is that it may be sold in a shelf-stable liquid form.

Another advantage of the present invention is that it may be sold in a novel packaging concept, that, when frozen, forms individual servings of perfectly molded and easily dispensed ice cubettes, which may be eaten all in one serving size (24 cubettes) or portioned out by the consumer and the rest returned to the freezer.

Another advantage of the present invention is that, for each flavor, the ingredients are combined using a thermal process, hot-filled into a tray, inverted, and held at a minimum temperature before cooling.

The details on one or more embodiments of the invention are set forth in the accompanying drawings and description below. The list of advantages above is not intended to be exhaustive. Other objects, features, and advantages of the invention will be apparent from the description and drawings, and from the claims.

DESCRIPTION OF THE DRAWINGS

Like reference symbols in the various drawings indicate like elements.

DETAILED DESCRIPTION

The present invention relates to bite-sized ice "cubettes" or ices composed of natural ingredients, a method for processing, and apparatus for packaging the same. Further explanation and variations of the present invention are described below with reference to FIGS. 1-8.

Figure 1:
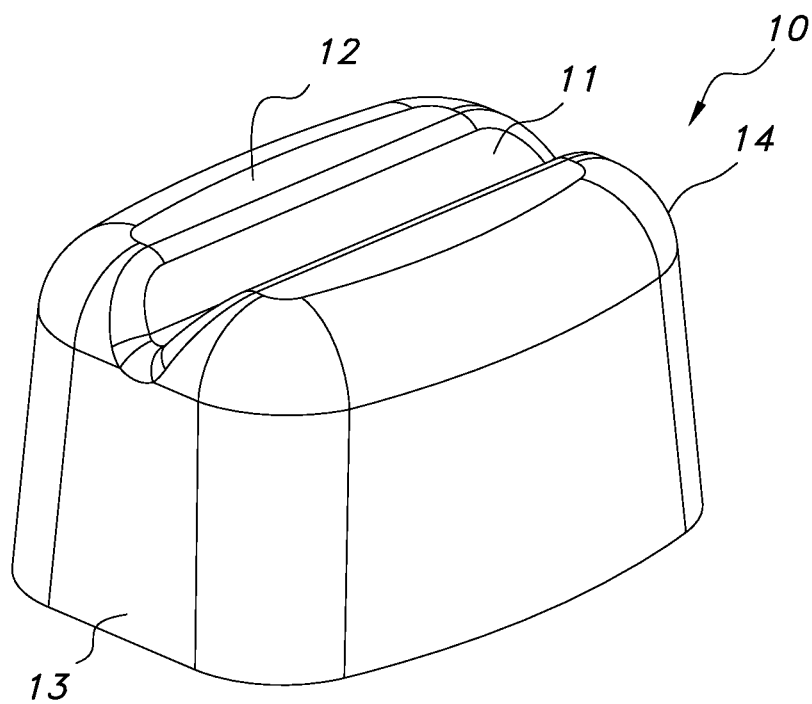
FIG. 1 is an illustrative front view of an ice cubette according to one embodiment of the present invention.
Figure 2:
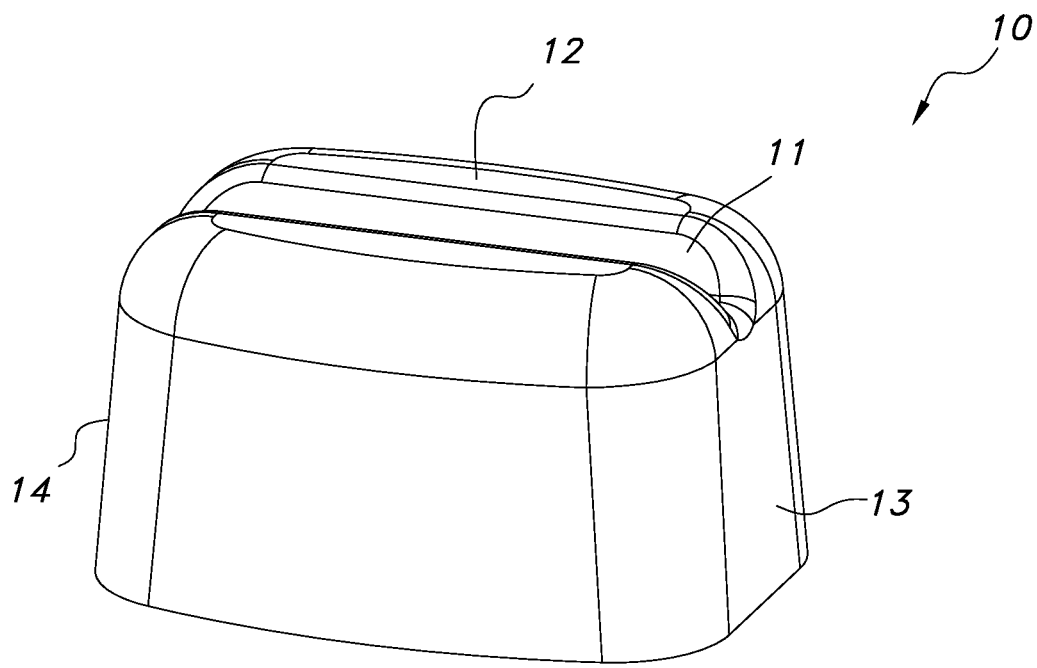
FIG. 2 is an illustrative side view of an ice cubette according to one embodiment of the present invention.

FIGS. 1-2 show an illustrative front view and side view of an ice cubette according to one embodiment of the present invention. The ice cubette 10 is preferably bite-sized and has an ornamental design. In a preferred embodiment, the ice cubette 10 has a distinctive groove 11 on the top 12 of the ice cubette and extends from a first side 13 of the cubette to a second side 14. The LifeIce® brand ice cubettes sold by LifeIce Inc. of New York, N.Y., are an example of such a product. The design of such a product is shown in copending Design patent application Ser. No. 29/450,226.

The present invention preferably comes in multiple flavor compositions, including Citrus Chomp®, Chocolate Crisp®, Green Grind®, and Berry Bite®. Each flavor composition preferably comprises a unique ingredient profile and is formulated with a variety of Superfoods and other natural health boosters.

Table 1 below shows an exemplary ingredient profile and formulation for a Citrus Chomp® flavor according to one embodiment of the present invention:

TABLE 1

| CITRUS CHOMP ® | |
|---|---|
| Ingredients | Percentage (%) |
| Water | 82.95 |
| Agave Syrup | 9.35 |
| Coconut Water Concentrate | 2.00 |
| Orange Juice Concentrate | 1.40 |
| Apple Juice Concentrate | 1.36 |
| Mangosteen Puree | 1.21 |
| Baobab, Dried | 0.85 |
| Pectin/Guar Gum Blend | 0.38 |
| Beta Carotene Powder | 0.18 |
| Lemon Puree | 0.13 |
| Blood Orange Flavor | 0.09 |
| Meyer Lemon Flavor Extract | 0.05 |
| Ginger, Minced | 0.05 |
| Total | 100 |

Table 2 below shows an exemplary ingredient profile and formulation for a Chocolate Crisp® flavor according to another embodiment of the present invention:

TABLE 2

| CHOCOLATE CRISP ® | |
|---|---|
| Ingredients | Percentage (%) |
| Water | 82.00 |
| Agave Syrup | 8.70 |
| Coconut Water Concentrate | 4.00 |
| Cherry Juice Concentrate | 1.60 |
| Black Currant Juice Concentrate | 1.20 |
| Cocoa Powder | 0.75 |
| Chocolate Flavor Natural | 0.50 |
| Vanilla Extract | 0.50 |
| Chocolate Flavor Natural "Dark Type" | 0.40 |
| Gellan Gum | 0.30 |
| Total | 100 |

Table 3 below shows an exemplary ingredient profile and formulation for a Green Grind® flavor according to another embodiment of the present invention:

TABLE 3

| GREEN GRIND ® | |
|---|---|
| Ingredients | Percentage (%) |
| Water | 85.30 |
| Coconut Water Concentrate | 5.00 |
| Agave Syrup | 4.00 |
| Apple Juice Concentrate | 3.20 |
| Banana Puree | 0.75 |
| Kale Juice | 0.50 |
| Lemon Puree | 0.35 |
| Gellan Gum | 0.30 |
| Green Tea Extract | 0.25 |
| Green Color Powder | 0.15 |
| Spirulina Powder | 0.10 |
| Chlorella Powder | 0.05 |
| Green Tea Flavor | 0.03 |
| Ginger, Minced | 0.02 |
| Total | 100 |

Table 4 below shows an exemplary ingredient profile and formulation for a Berry Bite® flavor according to another embodiment of the present invention:

TABLE 4

| BERRY BITE ® | |
|---|---|
| Ingredients | Percentage (%) |
| Water | 79.80 |
| Agave Syrup | 4.40 |
| Yumberry Juice Concentrate | 4.00 |
| Blueberry Juice Concentrate | 3.3 |
| Blackberry Juice Concentrate | 1.1 |
| Coconut Water Concentrate | 0.82 |
| Black Currant Concentrate | 0.22 |
| Pectin/Guar Gum Blend | 0.02 |
| Blueberry Type Flavor | 0.25 |
| Total | 100 |

The Citrus Chomp®, Green Grind® and Berry Bite® may occasionally add the ingredient Citric Acid to regulate the pH levels of the formulation. However, the amount of Citric Acid, however, is preferably less than the amount of the smallest percentage ingredient for each of these flavors.

The ice cubettes also preferably contain no preservatives and are low in calories and sugars, fat free, gluten free, genetically modified organism (GMO) free, and kosher. Table 5 below shows an exemplary nutritional profile for each flavor described above:

TABLE 5

| Nutrients | Citrus Chomp® Serving Size: 1 tray (61.8 g) (59 mL) | Berry Bite® Serving Size: 1 tray (62.3 g) (59 mL) | Chocolate Crisp® Serving Size: 1 tray (61.7 g) (59 mL) | Green Grind® Serving Size: 1 tray (61.4 g) (59 mL) |
|---|---|---|---|---|
| Basic Components | | | | |
| Calories (kcal) | 28.86 | 34.47 | 30.99 | 22.50 |
| Calories from Fat (kcal) | 0.20 | 0.03 | 0.64 | 0.22 |
| Fat (g) | 0.02 | 0.00 | 0.07 | 0.02 |
| Saturated Fat (g) | 0.00 | 0.00 | 0.04 | 0.02 |
| Trans Fatty Acid (g) | 0.00 | 0.00 | 0.00 | 0.00 |
| Cholesterol (mg) | 0.01 | 0.01 | 0.03 | 0.03 |
| Carbohydrates (g) | 7.03 | 8.40 | 7.01 | 5.45 |
| Dietary Fiber (g) | 0.49 | 0.14 | 0.20 | 0.07 |
| Total Sugars (g) | 6.18 | 7.60 | 6.43 | 4.97 |
| Protein (g) | 0.10 | 0.13 | 0.24 | 0.13 |
| Vitamins | | | | |
| Vitamin A - IU (IU) | 1864.62 | 1.75 | 8.72 | 19.20 |
| Vitamin C (mg) | 4.37 | 1.85 | 7.00 | 1.27 |
| Minerals | | | | |
| Sodium (mg) | 10.48 | 6.20 | 18.05 | 22.50 |
| Calcium (mg) | 9.64 | 10.01 | 11.25 | 11.58 |
| Iron (mg) | 0.05 | 0.13 | 0.16 | 0.14 |

In a preferred embodiment, the final equilibrium pH of the four flavors will not be greater than X. Given the formulations and maximum equilibrium pH, each formulation should receive a thermal process of $F_{16}^{200}=Y$ minutes or equivalent. Table 6 below provides the preferred pH and thermal process times in minutes of each formulation of the present invention:

TABLE 6

| Flavor | X (pH) | Y (minutes) |
|---|---|---|
| Citrus Chomp® | =<3.60 | 0.1 |
| Chocolate Crisp® | =<4.30 | 5.0 |
| Green Grind® | =<4.10 | 1.0 |
| Berry Bite® | =<3.60 | 0.1 |

In one embodiment, the thermal process can be accomplished with a hot fill hold such that the product and the package are sterilized at the same time. Alternatively, these products may be thermally processed based on the time and temperature chart shown in Table 7a-c below before filling into containers. In order to sterilize the container, the product must then be filled at a minimum temperature of 180° F., inverted (providing contact of hot product with the headspace and closure interior), and held at 180° F. for a minimum of 60 seconds (including inversion time) before cooling. In addition, a UV sanitizer is preferably incorporated into the process to sanitize both the trays and lidding prior to filling and sealing the product.

As such, these processes are sufficient to provide commercial sterility provided that the container is inverted after filling.

TABLE 7a

| (Citrus Chomp® and Berry Bite®) | | | | |
|---|---|---|---|---|
| Process Temperature (F. °) | 185 | 190 | 195 | 200 |
| Time (seconds) | 52 | 26 | 13 | 6 |
| Minimum Fill Temperature | | 180° F. | | |
| Minimum Total Holding Time After Filling | | 60 seconds | | |

TABLE 7b

| (Chocolate Crisp®) | | | | |
|---|---|---|---|---|
| Process Temperature (F. °) | 185 | 190 | 195 | 200 |
| Time (seconds) | 2598 | 1266 | 616 | 300 |
| Minimum Fill Temperature | | 180° F. | | |
| Minimum Total Holding Time After Filling | | 60 seconds | | |

TABLE 7c

| (Green Grind®) | | | | |
|---|---|---|---|---|
| Process Temperature (F. °) | 185 | 190 | 195 | 200 |
| Time (seconds) | 520 | 252 | 123 | 60 |
| Minimum Fill Temperature | | 180° F. | | |
| Minimum Total Holding Time After Filling | | 60 seconds | | |

Figures 3, 4:
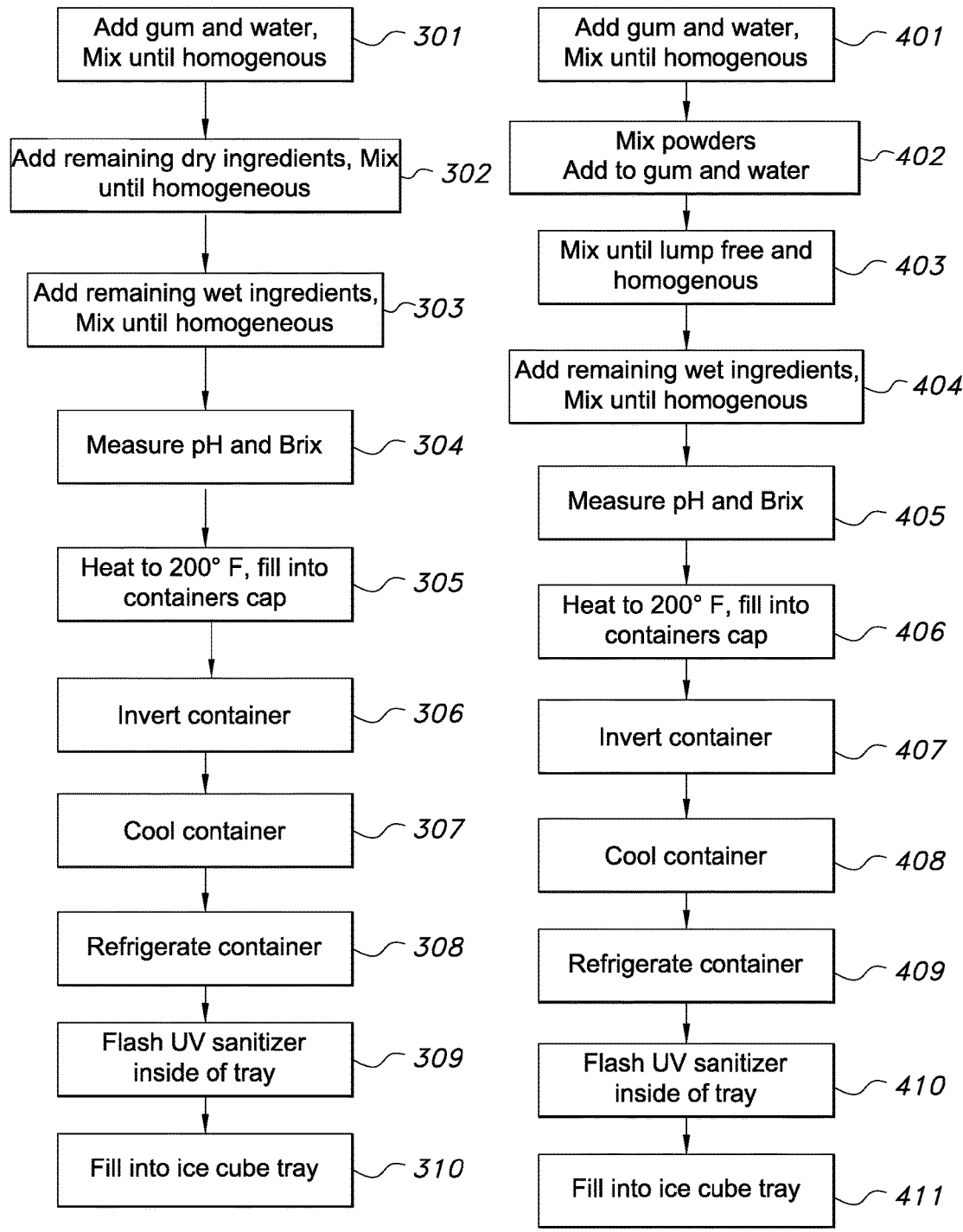
FIG. 3 depicts a preferred process flow for a Berry Bite® and a Citrus Chomp® embodiment of the present invention.
FIG. 4 depicts a preferred process flow for a Chocolate Crisp® embodiment of the present invention.

FIG. 3 depicts a preferred process flow for the Berry Bite® and Citrus Chomp® flavors of the present invention. In step 301, a gum is added to a warm water vortex and mixed vigorously until the mixture is homogenous. In step 302, the remaining dry ingredients are added to the gum and water blend vortex and mixed until homogenous. In step 303, the remaining wet ingredients are added to the blend and mixed until homogenous. In step 304, the pH and Brix are measured. In step 305, the mixture is heated to 200° F., filled into containers, and capped. In step 306, the container is held inverted for five minutes. In step 307, the container is cooled in a warm water bath followed by an ice water bath. In step 308, the container is refrigerated. In step 309, a UV sanitizer is flashed on the inside of an ice cubette tray. In step 310, the mixture is filled into the ice cubette tray and sealed with a peelable lidding.

FIG. 4 depicts a preferred process flow for the Chocolate Crisp® flavor of the present invention. In step 401, a gum is added to warm water vortex and mixed vigorously until the mixture is homogenous. In step 402, the powders are mixed together and then added to the gum and water blend vortex. In step 403, the mixture is mixed using a high shear mixer until it is free of lumps and homogenous. In step 404, the remaining wet ingredients are added to the blend and mixed until homogenous. In step 405, the pH and Brix are measured. In step 406, the mixture is heated to 200° F., filled into containers, and capped. In step 407, the container is held inverted for five minutes. In step 408, the container is cooled in a warm water bath followed by an ice water bath. In step 409, the container is refrigerated. In step 410, a UV sanitizer is flashed on the inside of an ice cubette tray. In step 411, the mixture is filled into the ice cubette tray and sealed with a peelable lidding.

Figure 5:
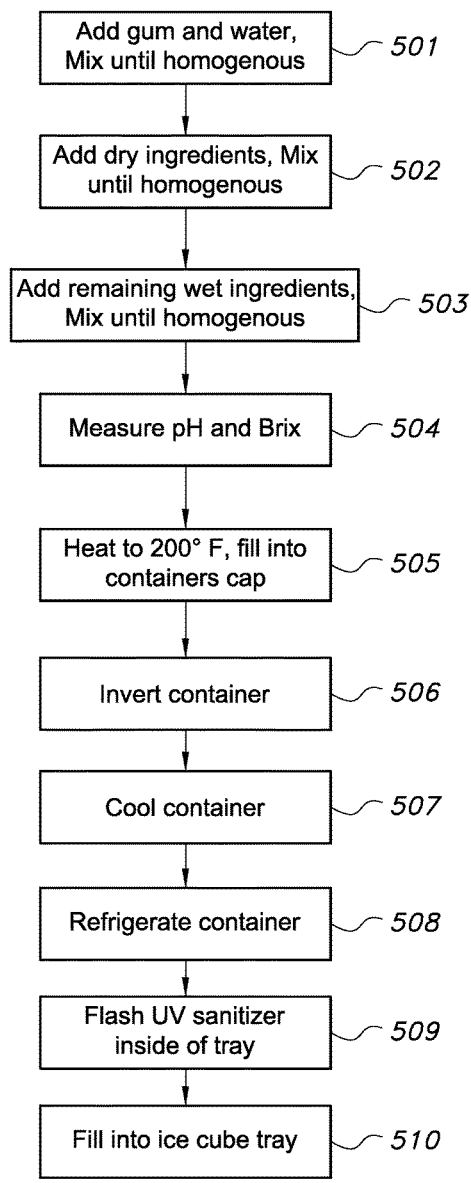
FIG. 5 depicts a preferred process flow for a Green Grind® embodiment of the present invention.

FIG. 5 depicts a preferred process flow for the Green Grind® flavor of the present invention. In step 501, a gum is added to warm water vortex and mixed vigorously until the mixture is homogenous. In step 502, the dry ingredients are added to the gum and water blend vortex. In step 503, the remaining wet ingredients are added and mixed until homogenous. In step 504, the pH and Brix are measured. In step 505, the mixture is heated to 200° F., filled into containers, and capped. In step 506, the container is held inverted for five minutes. In step 507, the container is cooled in a warm water bath followed by an ice water bath. In step 508, the container is refrigerated. In step 509, a UV sanitizer is flashed on the inside of an ice cubette tray. In step 510, the mixture is filled into an ice cubette tray and sealed with a peelable lidding.

Figure 6:
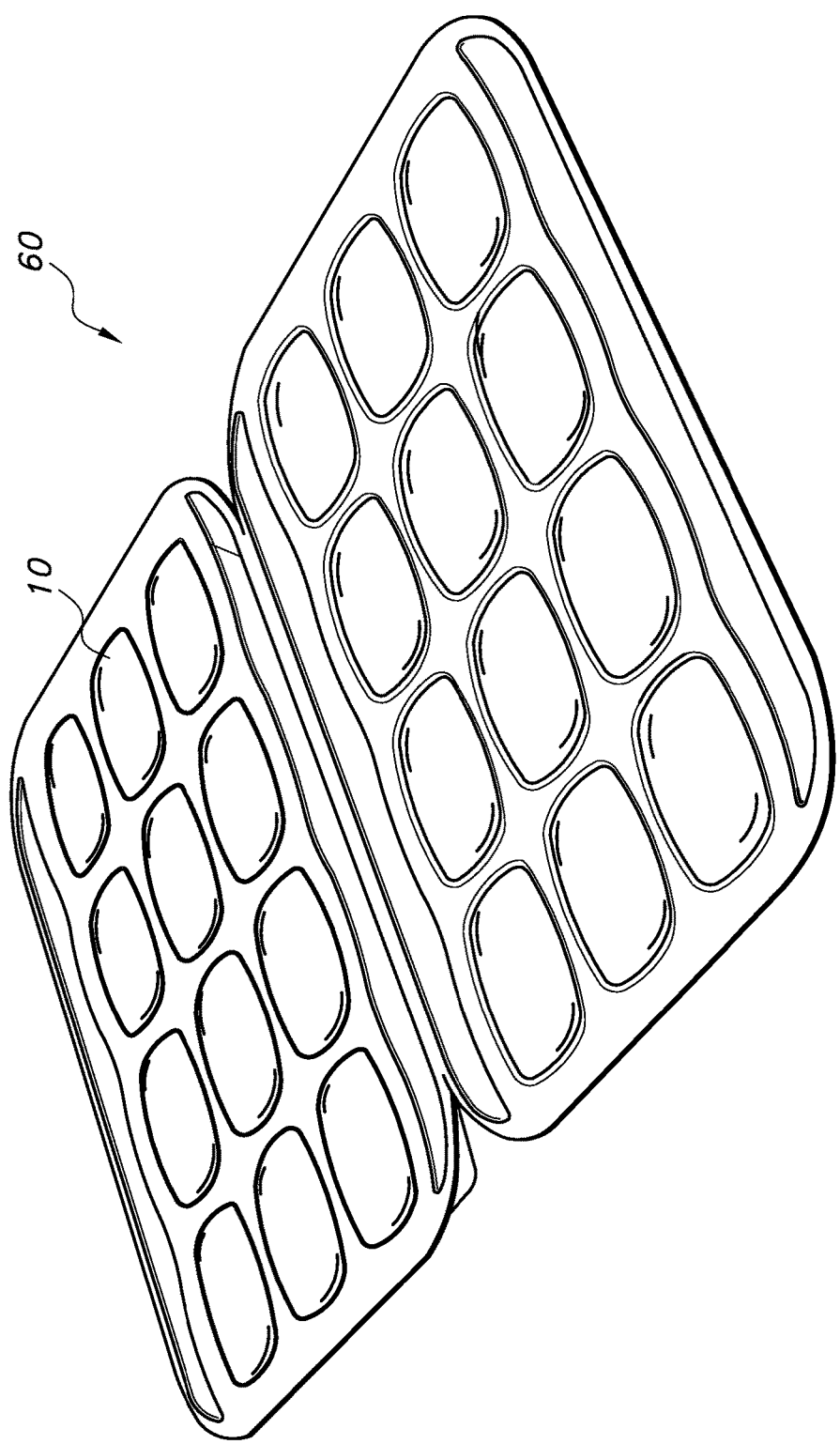
FIG. 6 is an illustrative view of the ice cubettes packaged in one tray, equal to one serving size, according to one embodiment of the present invention.
Figure 7:
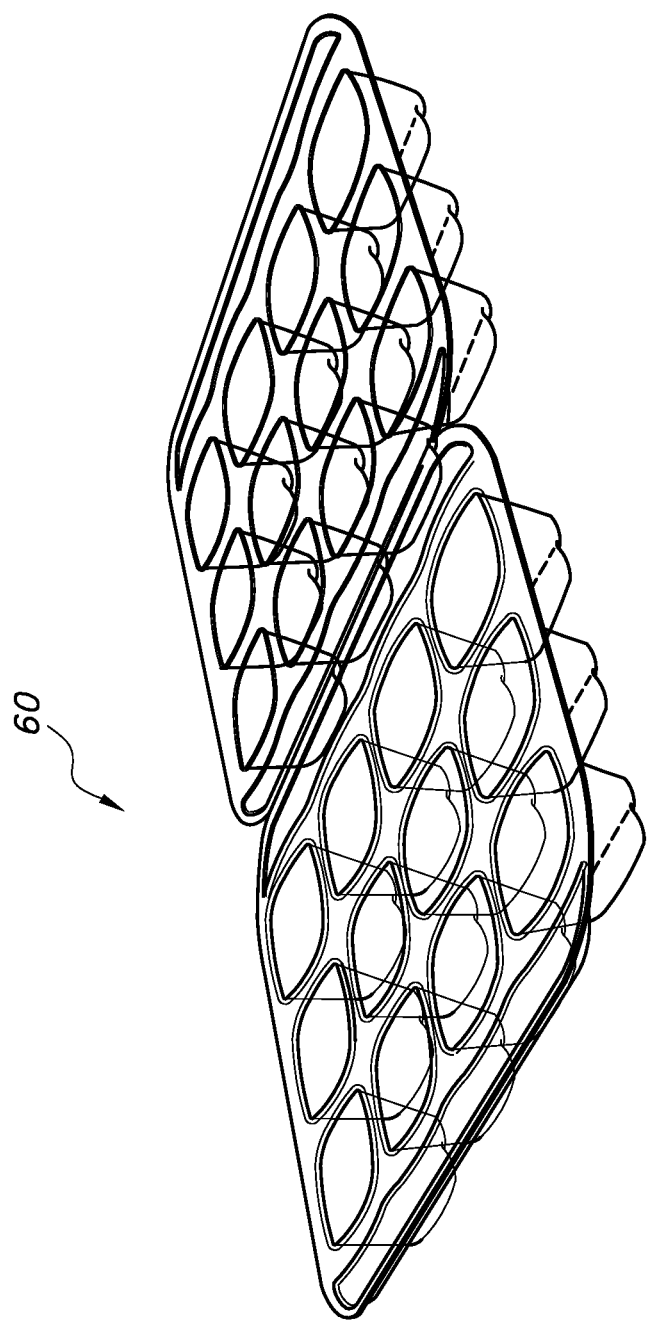
FIG. 7 is another illustrative view of an empty tray according to one embodiment of the present invention.
Figure 8:
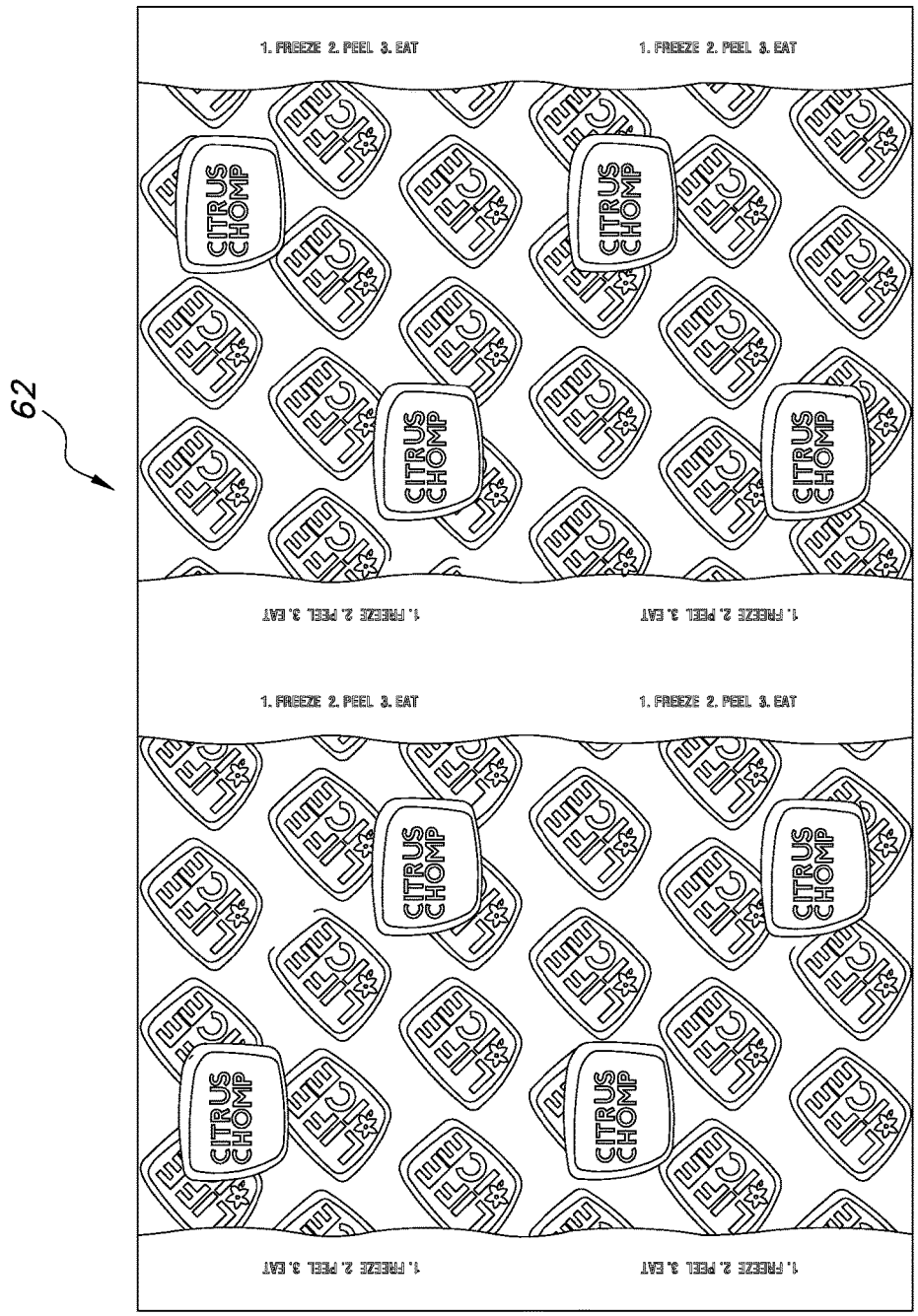
FIG. 8 is an illustrative view of a lidding to a tray, according to one embodiment of the present invention.

FIG. 6 is an illustrative view of ice cubettes packaged in a packing tray according to one embodiment of the present invention. The packaging includes both an ice cubette tray 60 and lidding 62, as shown in FIG. 8. FIG. 7 is another illustrative view of an empty tray, equal to one serving size, according to one embodiment of the present invention. The tray 60 comprises a plurality of receptacles 66 for holding liquid product and forming an individual cubette. The tray 60 is preferably made of thermoformable material with a high oxygen barrier (e.g., 0.1 cc/day/100 sq in or lower) suitable for shelf stable application. The tray 60 thickness is preferably in the range 0.012"-0.020". The tray 60 is preferably hot fill capable up to 185° F. and can be held at 185° F. for at least three minutes. The tray 60 may have direct contact with liquid food at a pH of 3.9-4.2. The tray 60 is preferably pasteurizable (i.e., can be cooked at 212° F.) and/or retortable (i.e., can be cooked at 250° F. and up). The tray 60 is also preferably made from a rigid and clear material, such as PVC/EVOH/PE laminate or other suitable materials.

In a preferred embodiment, the tray also comprises an easy peel lidding 62 designed to work with the tray material. FIG. 8 is an illustrative view of a lidding to a tray according to one embodiment of the present invention. The lidding 62 also preferably has a high oxygen barrier (e.g., 0.1 cc/day/100 sq in or lower) suitable for shelf stable applications. The lidding 62 is also usable in a 185° F. hot fill application and may be held at 185° F. for at least three minutes. The lidding may have direct contact with liquid food at a pH of 3.9-4.2. The lidding 62 also preferably has an outer layer that can be reverse printed or overprinted with white unless the lidding itself is white.

The packaging preserves product integrity from factory to shelf, allowing the product to be sold shelf stable and delivered as a freeze and eat product, thereby providing convenience to the consumer. The packaging is also bisphenol A (BPA) free.

A number of embodiments of the invention have been described. Nevertheless, it will be understood that various modifications may be made without departing from the spirit and scope of the invention. Accordingly, other embodiments are contemplated within the scope of the following claims.

I claim:

1. A method of forming a shelf-stable, freezable liquid composition consisting essentially of the following ingredients: water, coconut water concentrate, agave syrup, gum, fruit or vegetable concentrate, powder or puree, and natural flavor; wherein the mixture is at least 75% water and has a caloric content in the range of 1 to 5 calories per 2 cc comprising the steps of:
   high-shear mixing the liquid composition into a homogeneous mixture;
   heating the mixture;
   filling the mixture into a container;
   capping the container, and
   sterilizing the mixture wherein the mixture is shelf stable and preservative free.

2. The method of claim 1, further comprising of the steps of:
   sanitizing a high-oxygen-barrier tray and a high-oxygen-barrier peelable lidding using UV light;
   hot filling the mixture into the tray and sealing the tray with the peelable lidding; and
   inverting the tray; and
   cooling the mixture.

3. The method of claim 2 further comprising the step of forming the mixture in the tray into a plurality of icy cubettes, the icy cubettes having a distinctive groove that extends from a first side of the icy cubette to a second side.

4. The method of claim 1 wherein the fruits or vegetable concentrate comprises one or more of the following ingredients: orange juice concentrate, apple juice concentrate, cherry juice concentrate, kale juice, yumberry juice concentrate, blueberry juice concentrate, blackberry juice concentrate, and black currant concentrate.

5. The method of claim 1 wherein the powder or puree comprises one or more of the following ingredients: cocoa powder, green tea extract, spirulina powder, chlorella powder, banana puree, mangosteen puree, lemon puree, and minced ginger.

6. The method of claim 1 wherein the natural flavor comprises one or more of the following ingredients: blood orange flavor, lemon flavor extract, chocolate flavor, vanilla extract, green tea flavor, and blueberry flavor.

7. The method of claim 1 wherein the gum is a gellan gum or a guar gum.

8. The method of claim 1 wherein the liquid composition comprises pectin.

* * * * *